United States Patent [19]

Mitchell et al.

[11] Patent Number: 5,745,921
[45] Date of Patent: May 5, 1998

[54] MOISTURE-TRANSFERRING SWEAT BAND

[76] Inventors: Albert W. Mitchell, 3244 Cobblestone Dr., Pace, Fla. 32571; Mark Gifford, 817 Oak Glen Dr., Houston, Tex. 77076

[21] Appl. No.: 740,847

[22] Filed: Nov. 4, 1996

[51] Int. Cl.$^6$ .................................................. A42C 5/02
[52] U.S. Cl. ................................. 2/181; 2/171; 2/DIG. 11
[58] Field of Search ........................ 2/171, 200.1, 209.3, 2/DIG. 11, 181

[56] References Cited

U.S. PATENT DOCUMENTS

| | | | |
|---|---|---|---|
| 2,696,007 | 12/1954 | Larkin et al. | 2/171 |
| 4,521,922 | 6/1985 | Mitchell et al. | 2/171 |

*Primary Examiner*—Diana Biefeld
*Attorney, Agent, or Firm*—Renner, Kenner, Greive, Bobak, Taylor & Weber

[57] ABSTRACT

A sweat band for absorbing and transferring moisture from the brow of a wearer's head including, an elongate body (10) having a generally tubular medial portion (11) for engaging the brow of a wearer's head and extending ends (12, 13) for securing the band about the wearer's head with the medial portion thus positioned, the medial portion of the elongate body formed of a porous cloth cover (15) on the outer surface thereof, a layer of porous batting material (25) disposed internally of the porous cloth cover in a generally tubular configuration, a surface skin (30, 31) on each side of the layer of porous batting material providing retention of and travel of moisture longitudinally of the layer of porous batting material, and securing elements (40, 41) retaining the layer of porous batting material and the surface skin in a predetermined position relative to the porous cloth cover.

18 Claims, 2 Drawing Sheets

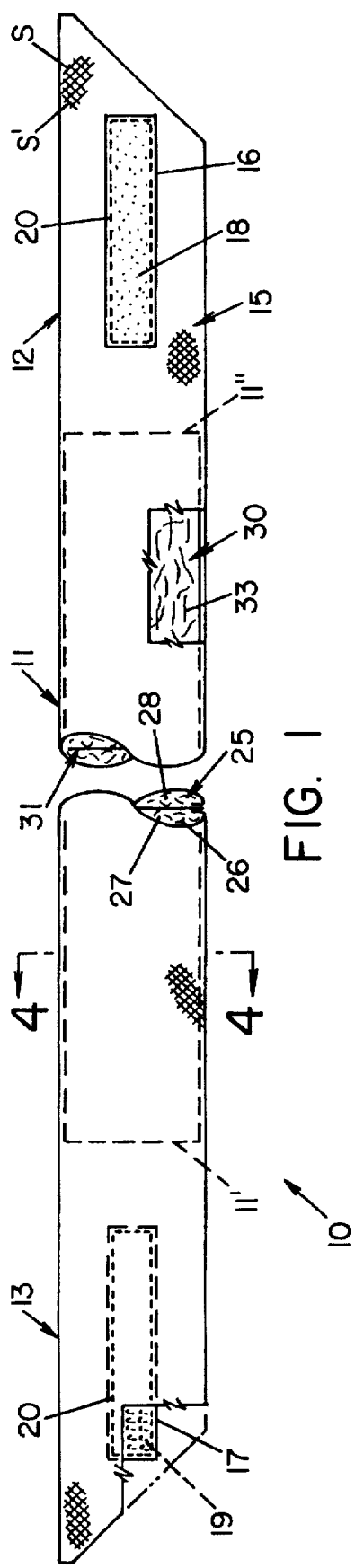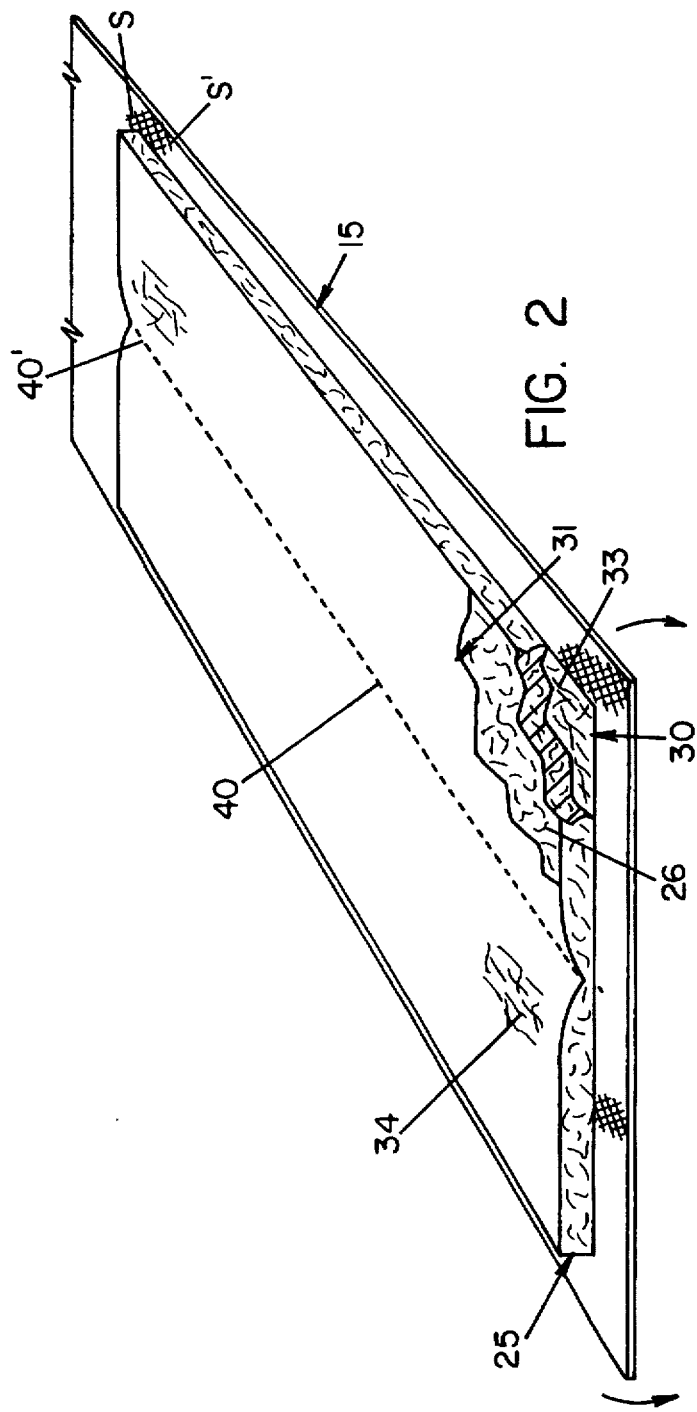

MOISTURE-TRANSFERRING SWEAT BAND

TECHNICAL FIELD

The present invention relates generally to wearing apparel which has functional characteristics. More particularly, the present invention relates to a sweat band which serves to keep moisture off a person's face and particularly out of a wearer's eyes while also serving as a decorative head piece, if so desired. More specifically, the present invention relates to a sweat band for a person's brow which has improved efficiency in absorbing perspiration and transferring it away from the brow of a wearer.

BACKGROUND ART

Sweat bands have long been employed on the human head, wrist, and even around the neck to control the flow of perspiration in conjunction with athletic events, work, or merely for additional comfort in tropical weather environments. Originally, sweat bands tended to be very simple in construction, often constituting a rectangular piece of cotton cloth such as a bandanna rolled lengthwise into a roll and tied with a knot about a person's head, neck, or wrist. Another simple form of sweat band employs a scarf or other piece of cloth material which is in the shape of, or can be folded into, a triangle with one leg and a major portion of the body extending over the head and the other two legs tied with a knot about the head. Devices of this type combine a head covering with a portion of one side of the triangle positioned across the brow to assist in controlling perspiration. These examples of early sweat bands, which date back years if not centuries, function to an extent in controlling perspiration but become essentially non-functional when they become fully saturated in conditions producing heavy perspiration.

More recently, sweat bands have been created having multiple layers of cotton on the theory that a greater volume of material will hold correspondingly proportionally greater quantities of moisture. These multiple-layer sweat bands encountered the problem that the brow-engaging portion tended to sag or be displaced downwardly from the brow to the eyes when the multiple layers became saturated with moisture. In order to obviate this problem, these multi-layer cotton sweat bands have been interwoven with elastic materials in an effort to prevent sagging or displacement of the brow-engaging portion of the sweat band by supplying a degree of tension. Although helpful in solving the problems of multi-layer cotton bands, any significant number of layers nevertheless tend to sag or be displaced, despite the elastic material, unless the sweat band is tensioned to an extent such as to provide discomfort to a person wearing the sweat band.

Another approach to improving the performance of sweat bands has involved the use of secondary materials that are positioned particularly in the brow area and have higher moisture absorbency characteristics. Secondary materials which have been used in this fashion include sponge rubbers and synthetic foams. However, these constructions are subject to the sagging or displacement problems discussed hereinabove since they are incapable of moving moisture to an area outside the secondary material and require additional drying time to recover their full absorption capability.

A more recent sweat band has used a cotton cloth outer covering with a secondary material internally thereof composed of a dacron polyester backing material sewn into the tubular outer covering. With this construction, moisture is somewhat stratified to improve evaporation and be wicked toward the ends of the sweat band and thus be transmitted to the hairline to prevent accumulation of excess moisture in the brow area of a wearer. A sweat band of this type is described in U.S. Pat. No. 4,521,922 issued Jun. 11, 1985.

This latter sweat band construction offers what has previously constituted the greatest management of moisture; however, certain disadvantages have been encountered. For example, a loosely-spun, somewhat resilient batting material has normally been employed, which produces difficulties in manufacturing such sweat bands. A loosely-spun batting material is difficult to cut and sew or affix in a precise position and with uniform thickness. In addition, the batting material is subject to shifting and becoming disorganized during repeated use and cleaning. In addition, in some applications, the moisture that is normally wicked by the batting material toward the ends of the sweat band may be wicked from the hairline area back to the brow or forehead when a person wearing the sweat band bends over or orients the forehead below the hairline area. Finally, the loosely-spun batting fibers are subject to migration through the outer covering material, which may be soft, absorbent cotton, and, thus, can be a source of irritation to persons with sensitive skin. This migration also reduces the efficiency of the wicking operation of the sweat band.

DISCLOSURE OF THE INVENTION

An object of the present invention is to provide a sweat band internal batting material with a surface skin which improves retention of moisture within the batting material. Another object of the invention is to provide such a sweat band wherein the surface skin retards excess moisture from flowing from the batting to the cloth covering and operates to wick excess moisture away from the brow of a wearer to the hairline area where the batting material terminates and moisture can be discharged away from the eyes. A further object of the present invention is to provide such a sweat band wherein the surface skin on the batting material tends to preclude the flow of moisture from the batting material back to the cloth cover to thereby facilitate the wicking away of moisture and the maintenance of the cloth cover in a drier condition, which facilitates the absorption of additional external moisture with which the outer cloth cover is in contact. Yet another object of the present invention is to provide such a sweat band wherein the surface skin on the batting material permits the sweat band to be heavily saturated with cool water or the like prior to being applied to the head, wrist, or neck without excessive discharge of the fluid from the outer cloth cover.

Another object of the present invention is to provide a sweat band having a surface skin on the batting material positioned interiorly of the cloth cover, which greatly facilitates manufacture of the bands. A further object of the present invention is to provide such a sweat band wherein the surface skin on the batting material permits it to be more readily controlled to allow cutting of the material during fabrication in a faster and more consistent manner. Yet another object of the present invention is to provide such a sweat band wherein the surface skin on the batting material provides more body to facilitate feeding of the batting material to a sewing machine during the manufacturing process in both a faster and more consistent manner. Still a further object of the present invention is to provide such a sweat band wherein the surface skin on the batting material provides improved body to the batting material for more securely attaching the batting material to the cloth cover. Still another object of the present invention is to provide such a sweat band wherein after the attachment of the batting material to the cloth cover, the final manufacturing step of turning the batting material and cloth cover inside out may be quickly and easily effected without displacement of the batting material from its sewn position during the manufacturing process.

Another object of the present invention is to provide a sweat band wherein the material layers in the brow-engaging portion have improved stability, giving the sweat band a firmer feel. Yet a further object of the present invention is to provide such a sweat band that has an improved capability for maintaining its shape and body over a period of years, despite extensive use and repeated washing. Yet another object of the present invention is to provide such a sweat band wherein the surface skin on the batting material prevents the fibers of the batting material from migrating through the porous cloth cover to thus eliminate a source of skin irritation or reduce the capability of the sweat band to absorb and transfer moisture. Still a further object of the present invention is to provide such a sweat band wherein the cost of components and assembly can be effected competitive with other relatively sophisticated sweat bands currently on the market.

In general, the present invention contemplates a sweat band for absorbing and transferring moisture from the brow of a wearer's head having, an elongate body with a generally tubular medial portion for engaging the brow of a wearer's head and extending ends for securing the band about the wearer's head with the medial portion thus positioned, the medial portion of the elongate body formed of a porous cloth cover on the outer surface thereof, a layer of porous batting material disposed internally of the porous cloth cover in a generally tubular configuration, a surface skin on each side of the layer of porous batting material providing retention of and travel of moisture longitudinally of the layer of porous batting material, and securing elements retaining the layer of porous batting material and the surface skin in a predetermined position relative to the porous cloth cover.

BRIEF DESCRIPTION OF THE DRAWINGS

FIG. 1 is a fragmentary planar elevational view with portions broken away of an assembled moisture-transferring sweat band according to the concepts of the present invention depicting the tubular medial portion for engaging a wearer's brow and the extending ends for securing the band about a wearer's head.

FIG. 2 is a fragmentary perspective view of the tubular medial portion of the sweat band of FIG. 1 showing the porous cloth outer surface, the porous batting material, and the surface skin on the batting material in the initial stages of assembly.

PREFERRED EMBODIMENT FOR CARRYING OUT THE INVENTION

Figure 3:
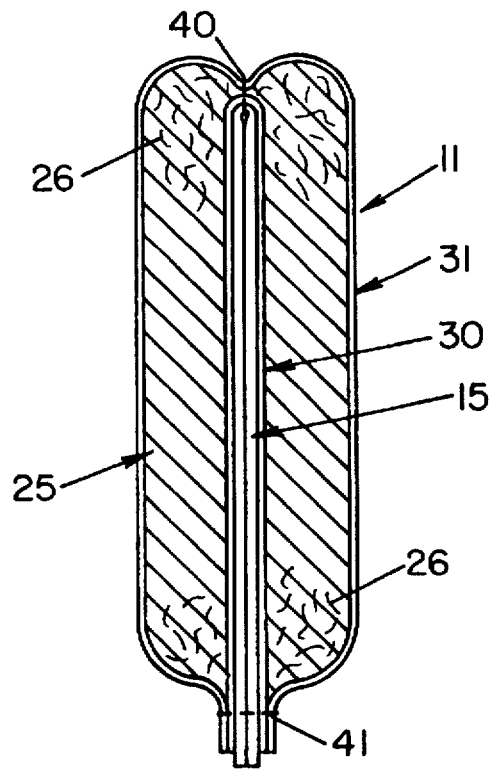
FIG. 3 is a cross-sectional view through tubular medial portion of the sweat band showing the assembly steps subsequent to FIG. 2.

A sweat band according to the concepts of the present invention is shown in a preferred form as a head band, generally indicated by the numeral 10 in FIG. 1 of the drawings. As shown, the head band 10 has a tubular medial portion, generally indicated by the numeral 11, with extending ends, generally indicated by the numerals 12 and 13, projecting from the two longitudinal extremities 11' and 11" of the tubular medial portion 11.

The head band 10 may be appropriately sized to effect its intended function; however, the head band 10 depicted in the drawings is an elongated body having an appropriate width to cover a substantial portion of a person's brow and a length sufficient to provide an extent of overlap for securing about a person's head. It has been empirically determined that head band 10 may have a width of approximately 1½–2 inches and a length of 28–30 inches for convenient utilization by most people.

The medial portion 11 and ends 12, 13 may be externally conventionally constructed of a cloth cover, generally indicated by the numeral 15. The cover 15 is made from a piece of relatively porous cloth which is preferably a cotton/polyester blend fabric. In order to maintain the open-pore characteristics and provide an extent of longitudinal flexibility, the cover 15 is bias-cut relative to the longitudinal dimension of the cover 15. In the preferred form depicted in FIG. 1, the cross strands S and S', shown at random locations along the length of cover 15, are disposed at an angle of approximately forty-five degrees with respect to a longitudinal axis of cover 15. As seen, the constitution of cover 15, as to its preferred strand configuration, is uniform throughout the length and width of the folded over rectangular extent of cloth from which the cover 15 is formed.

The ends 12 and 13 of head band 10 are provided in the preferred form of the invention with temporary fasteners 16 and 17, which are preferably positioned proximate to the extremities of ends 12, 13. As shown, one of the fasteners 16, 17 carries a loop pile 18, and the other of fasteners 16, 17 may have hooks 19 to provide a quick release fastening system of a type sold under the Velcro brand name, or the like. The fasteners 16 and 17 may advantageously have a substantial length positioned longitudinally of and proximate to the extremities of ends 12, 13 as by stitching 20. It will be appreciated that fastener 16 is located on one side of cover 15, and fastener 17 is positioned on the reverse side thereof, such that the fasteners 16 and 17 are in face-to-face relation when the head band 10 is encircled about a wearer's head and the ends 12, 13 are overlapped for temporary attachment and subsequent detachment, as desired. It is to be appreciated that the ends 12, 13 could be provided with a different fastener configuration, such as an adjustable buckle, strands that could be tied, snaps or catches, or the like.

The ends 12, 13 of head band 10 are essentially flat as being constituted of two layers of the cover 15 sewn along one edge and the ends thereof to provide a closed configuration. The stitching 20 on fasteners 16, 17 preferably extends through both layers of cover 15 and ends 12, 13 to assist in maintaining a substantially planar configuration in that area. Between the ends 12, 13, the tubular medial portion 11 of head band 10 is of a different configuration, as hereinafter detailed, and extends over the brow area of a wearer and preferably a distance into the hairline, e.g., approximately the front edge of the ears of a wearer of the head band 10. A longitudinal dimension on the order of ten or eleven inches has been found to be appropriate for effecting this function.

Central to the accumulation and transfer of moisture in the tubular medial portion 11 of head band 10 is a batting material, generally indicated by the numeral 25, which is disposed within the cover 15. A preferred material for the batting material 25 is a dacron and polyester blend of randomly-oriented fibers 26. The material employed may be approximately a quarter of an inch in thickness in its normal state and is sufficiently loosely woven such as to be springy or resilient and sufficiently porous to permit good wicking action for perspiration or water. As can be seen from FIGS. 1, 2, and 4, the batting material 25 may conveniently be composed of a rectangular sheet having a length equal to the length of tubular medial portion 11 and a width slightly less than twice the width of cover material 15 in tubular medial portion 11 (see FIGS. 2 and 4). The batting material 25 is formed into a first semi-circular section 27 and a second semi-circular section 28, which together generally define the outer contour of tubular medial portion 11.

A significant feature of the instant invention is that batting material 25 has surface skins, generally indicated by the numerals 30 and 31. As will be particularly appreciated from FIG. 4, a portion of surface skin 30 and a portion of surface skin 31 cooperate to fully encapsulate each of the semi-circular sections 27, 28 of batting material 25. The surface skins 30, 31 are preferably a fused, woven outer skin attached to the batting material 25 that binds the loose ends of the batting fibers 26 to form a membrane-like layer. The surface skins 30 and 31 are of a nature such that they do not significantly restrict the flow of moisture from the cover 15 to the batting material 25 but tend to retard possible reverse flow of moisture from the batting 25 to the cover 15. A preferred material for the surface skins 30, 31 is a dacron and polyester blend.

The surface skins 30, 31 may also be advantageously constructed in a fashion such that the great majority of the fibers 33 and 34 of surface skins 30, 31, respectively, are oriented longitudinally of the tubular medial portion 11 of head band 10. This orientation of strands 33 and 34 operates to facilitate the travel of moisture within the batting material 25 longitudinally of tubular medial portion 11 for discharge and dispersal at the longitudinal ends thereof in the hairline area of a person wearing head band 10, as previously detailed. The surface skin 30, 31 may be formed such as to have a relatively smooth or even slick outer surface. This facilitates readjustment of the batting material 25 inside cover 15 to a uniform dispersal in areas where these members are not attached, which may take place when head band 10 is washed, wrung out, or is otherwise distorted from its normal configuration, as depicted in FIG. 1.

Figure 4:
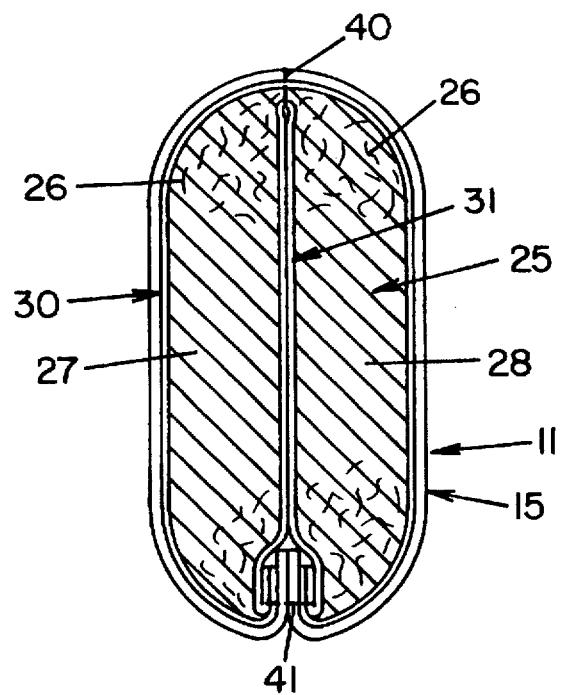
FIG. 4 is a cross-sectional view through the tubular medial portion of the sweat band taken substantially along the line 4—4 of FIG. 1 in fully assembled form.

While the basic structure depicted in FIGS. 1 and 4 for the head band 10 may be achieved in various ways, the resultant structure is amenable to an easy assembly technique, which is best explained in relation to FIGS. 2, 3, and 4 of the drawings. As can be seen in FIG. 2, the portion of cover 15 constituting the medial portion 11 of head band 10 is initially laid up in a flat planar condition. As further seen in FIG. 2, the batting material 25 with the surface skins 30 and 31 has been appropriately cut and positioned on cover 15. The surface skin 30 reposes against cover 15, whereas the surface skin 31 of batting material 25 is the uppermost element. As previously noted, the batting material 25 has been cut to a length constituting the desired longitudinal length of tubular medial portion 11. Batting material 25 and surface skins 30, 31 are laterally centered on cover 15, with an extent of cover 15 extending laterally outwardly beyond the batting material 25.

As seen in FIGS. 2-4, the cover 15 and batting material 25, including surface skins 30, 31, are secured longitudinally the length of batting material 25 at a point medially of the lateral dimension thereof by a line of sewing stitches 40 forming a seam 40'. The partially assembled medial portion 11 is then folded over itself about the seam 40' formed by stitches 40 in the direction of the arrows seen in FIG. 2 to assume the configuration depicted in FIG. 3. It will be noted that the folded over cover 15 is located centrally of the medial portion 11 at that time and flanked on either side by surface skin 30, batting material 25, and surface skin 31.

Once positioned as depicted in FIG. 3, the lateral extremities of the cover, the skin surface 30, and the skin surface 31 are joined by through stitches 41 extending the length of the medial portion 11. It will be observed that tubular medial portion 11 in the final form of FIG. 4 may be achieved merely by turning the assembly of FIG. 3 inside out so that surface skin 31 reposes in the middle of medial portion 11 and is flanked to either side thereof by semi-circular sections 27, 28 of batting material 25, outer skin 31, and cover 15 constituting the entire outer surface. It will be appreciated that the aforementioned smooth characteristic of surface skins 30, 31 will facilitate the operation of turning the medial portion 11 inside out and the resumption of uniform positioning of the batting material 25 along medial portion 11 subsequent to this operation.

It will be appreciated by persons skilled in the art that batting material 25 with surface skins 30, 31 can readily be incorporated into triangular bands which cover a wearer's hair as well as the brow area or other types of sweat bands, particularly where traverse of moisture longitudinally of the sweat band may be significant to the dispersal of excess moisture.

Thus, it should be evident that moisture-transferring sweat band disclosed herein fulfills one or more of the various objects of the present invention set forth above and otherwise constitutes an advantageous contribution to the art. As will be apparent to persons skilled in the art, modifications can be made to the preferred embodiment of the present invention disclosed herein without departing from the spirit of the invention, the scope of the invention being limited solely by the scope of the attached claims.

We claim:

1. A sweat band for absorbing and transferring moisture from the brow of a wearer's head comprising, an elongate body having a generally tubular medial portion for engaging the brow of a wearer's head and extending ends for securing the band about a wearer's head, said medial portion of said elongate body formed of a porous cloth cover on an outer surface thereof, a layer of porous batting material disposed internally of said porous cloth cover in a generally tubular configuration, a surface skin on each side of said layer of porous batting material providing retention of and travel of moisture longitudinally in relation to said layer of porous batting material, and securing elements retaining said layer of porous batting material and said surface skin in a predetermined position relative to said porous cloth cover.

2. A sweat band according to claim 1, wherein said surface skin is made of woven fibers and has a substantial plurality of said fibers aligned longitudinally in relation to said tubular medial portion of said elongate body to facilitate the travel of moisture longitudinally in relation to said elongate body.

3. A sweat band according to claim 1, wherein said surface skin is a dacron and polyester material.

4. A sweat band according to claim 1, wherein said securing elements are arranged so that said layer of porous batting material is totally encased within said surface skin to thereby prevent migration of said layer of porous batting material through said porous cloth.

5. A sweat band according to claim 1, wherein said securing elements are stitches.

6. A sweat band according to claim 5, wherein said stitches are in at least one row extending exclusively longitudinally in relation to said layer of porous batting material and said porous cloth.

7. A sweat band according to claim 6, wherein said stitches are formed in two rows extending longitudinally in relation to said porous cloth, one of said rows attaching an overlapped portion of said porous cloth to itself to form said tubular medial portion of said elongate body from a generally rectangular extent of said porous cloth.

8. A sweat band according to claim 7, wherein said rectangular extent of said porous cloth has cross strands and is bias cut relative to the cross strands.

9. A sweat band according to claim 8, wherein said porous cloth is made of a cotton and polyester blend fabric.

10. A sweat band according to claim 1, wherein said porous cloth forms the extending ends of said elongate body.

11. A sweat band according to claim 10, wherein said extending ends of said elongate body have fastener elements for selective adjustable interconnection of said extending ends.

12. A sweat band according to claim 11, wherein said fastener elements are hook and loop connectors.

13. A sweat band according to claim 1, wherein said surface skin has a slick outer surface for sliding engagement with said cloth cover.

14. A sweat band for absorbing and transferring moisture from the brow of a person's head comprising, an elongate body having a generally tubular medial portion for engaging the brow of a person's head, ends of said elongate body which may be extended about the person's head, fastener means for securing the band about a wearer's head, said medial portion of said elongate body formed of a porous cloth cover on an outer surface thereof, a layer of porous batting material disposed internally of said porous cloth cover in generally uniform dispersal, a surface skin encapsulating said layer of porous batting material and providing retention of and travel of moisture longitudinally in relation to said layer of porous batting material, and securing means for retaining said layer of porous batting material and said surface skin in a predetermined position relative to said porous cloth cover.

15. A sweat band according to claim 14, wherein said layer of batting material assumes a generally tubular configuration.

16. A sweat band according to claim 15, wherein said layer of batting material is a rectangular sheet, having said surface skin on each side thereof which has been folded over upon itself and seamed to effect encapsulation of said layer of batting material by said surface skin.

17. A sweat band according to claim 16, wherein said rectangular sheet is in the form of a pair of semi-circular sections, each being individually encapsulated within said surface skin.

18. A sweat band according to claim 14, wherein said surface skin is a fused, woven blend of dacron and polyester material which is bound to loose ends of fibers in said layer of batting material.

* * * * *